United States Patent
Wimberger et al.

(10) Patent No.: US 8,752,426 B2
(45) Date of Patent: Jun. 17, 2014

(54) FILL-LEVEL MEASURING DEVICE

(75) Inventors: Peter Wimberger, Zell (DE);
 Alexander Muller, Sasbach-Jechtingen (DE); Sergej Lopatin, Lorrach (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 52 days.

(21) Appl. No.: 13/496,056

(22) PCT Filed: Aug. 17, 2010

(86) PCT No.: PCT/EP2010/061936
 § 371 (c)(1),
 (2), (4) Date: Mar. 14, 2012

(87) PCT Pub. No.: WO2011/032793
 PCT Pub. Date: Mar. 24, 2011

(65) Prior Publication Data
 US 2012/0174665 A1 Jul. 12, 2012

(30) Foreign Application Priority Data

Sep. 16, 2009 (DE) .......................... 10 2009 029 490

(51) Int. Cl.
 *G01F 23/00* (2006.01)
(52) U.S. Cl.
 USPC .......................... 73/290 R; 73/290 V; 73/295
(58) Field of Classification Search
 USPC ..................................... 73/290 R, 290 V, 295
 See application file for complete search history.

(56) References Cited

U.S. PATENT DOCUMENTS 5,408,168 A * 4/1995 Pfandler ...................... 318/642
(Continued)

FOREIGN PATENT DOCUMENTS

| DE | 1591931 | 10/1970 |
|---|---|---|
| DE | 102005015546 A1 | 4/2005 |

(Continued)

OTHER PUBLICATIONS

English translation of the IPR, Mar. 29, 2012, WIPO, Geneva.
(Continued)

*Primary Examiner* — Hezron E Williams
*Assistant Examiner* — Hoang Nguyen
(74) *Attorney, Agent, or Firm* — Bacon & Thomas, PLLC

(57) ABSTRACT

A fill-level measuring device with a membrane, which is placed in such a manner on one of the two end region of a tubular housing that it seals the housing on such end region. An oscillatable unit is placed on the side of the membrane facing away from the housing, with a driver/receiver unit, which is composed of a plurality of piezoelectric elements arranged in a stack. The driver/receiver unit is placed via a pressure screw unit in such a manner in the housing that it oscillates in the direction of the longitudinal axis of the housing between the membrane and the pressure screw unit. The driver/receiver unit excites the oscillatable unit via the membrane to execute oscillations, with a control/evaluation unit, which evaluates amplitude, frequency and/or phase of the oscillations of the oscillatable unit and with a temperature sensor for determining temperature of the medium. The temperature sensor is integrated in a fill-level measuring device element, which is in thermal contact with the medium via the membrane or the housing, wherein the element is so selected that the oscillatable unit oscillates unimpaired by the temperature sensor.

11 Claims, 6 Drawing Sheets

(56) References Cited

U.S. PATENT DOCUMENTS

| | | | |
|---|---|---|---|
| 5,433,525 A | 7/1995 | El-Ibiary | |
| 5,625,343 A * | 4/1997 | Rottmar | 340/620 |
| 6,845,663 B2 * | 1/2005 | Lopatin et al. | 73/290 V |
| 6,920,787 B2 * | 7/2005 | Brutschin et al. | 73/290 V |
| 6,938,475 B2 * | 9/2005 | Lopatin | 73/290 V |
| 7,043,981 B2 * | 5/2006 | Kuhny et al. | 73/290 V |
| 2003/0152863 A1 * | 8/2003 | Prieta et al. | 430/270.1 |
| 2011/0186262 A1 | 8/2011 | Schulze | |

FOREIGN PATENT DOCUMENTS

| | | |
|---|---|---|
| DE | 10 2005 062813 B4 | 12/2005 |
| DE | 102005062813 A1 | 12/2005 |
| DE | 102006007199 A1 | 2/2006 |
| DE | 102005015546 | 10/2006 |
| DE | 102005062813 | 7/2007 |
| DE | 102006007199 | 8/2007 |
| DE | 102008029742 A1 | 6/2008 |
| DE | 102008029742 | 12/2009 |
| JP | 4191626 | 7/1992 |
| WO | 0166269 A1 | 3/2001 |
| WO | WO2007073837 * | 5/2007 |
| WO | WO 2007/073837 | 7/2007 |
| WO | WO2007/093197 | 8/2007 |
| WO | 2011-032793 A1 | 8/2010 |

OTHER PUBLICATIONS

International Search Report in German Language dated Dec. 22, 2010.

* cited by examiner

FILL-LEVEL MEASURING DEVICE

TECHNICAL FIELD

The present invention relates to a fill-level measuring device with a membrane, which is placed in such a manner on one of the two end regions of a tubular housing that it seals the housing on such end region. An oscillatable unit is placed on the side of the membrane facing away from the housing, with a driver/receiver unit, which is composed of a plurality of piezoelectric elements arranged in a stack. The driver/receiver unit is placed via a pressure screw in such a manner in the housing that it oscillates in the direction of the longitudinal axis of the housing between the membrane and the pressure screw, whereby it excites the oscillatable unit via the membrane to execute oscillations. A control/evaluation unit, evaluates amplitude, frequency and/or phase of the oscillations of the oscillatable unit and with a temperature sensor for determining temperature of the medium. The oscillatable unit is, for example, an oscillatory fork.

BACKGROUND DISCUSSION

Vibronic measuring devices are known to be used, among other things, for determining the reaching of a predetermined fill level or for monitoring a minimum or maximal fill level of liquids or bulk goods in a container. For determining whether a certain limit-level has been reached, the vibronic measuring device is placed at the corresponding height in the container.

Vibronic measuring devices have, as a rule, two rods, which are arranged like the tines of a fork and which are excited via a membrane of a drive unit to opposite phase oscillations at the resonance frequency. The drive is provided, in such case, via piezoelectric elements. If the oscillatory system is covered by the measured medium, then the oscillation is attenuated, wherein, in the case of bulk goods, essentially the amplitude change is evaluated and, in the case of liquids, essentially the frequency change is evaluated. Such vibronic measuring devices are available from Endress+Hauser under the marks, LIQUIPHANT (for liquids) and SOLIPHANT (for bulk goods). The construction of a Liquiphant measuring device is described, for example, in EP 1261437 B 1.

Also possible with such vibronic measuring devices is the determining of density of the measured medium. The higher the density of a liquid, the smaller is the resonance frequency. The resonance frequency has, however, a temperature dependence, so that, for an exact density determination, also temperature of the medium must be determined. Moreover, various types of applications are known, in the case of which, besides the fill level, also the process temperature must be determined.

Over the years, temperature measurement has been possible, for example, by introducing an additional temperature sensor externally, i.e. outside of the fill level- or density measuring device, via a separate process connection into the container. For a temperature compensated density measurement, the temperature sensor is connected, together with the density measuring device, to the evaluation computer. A disadvantage of using two separate measuring devices is that each additional process connection, besides increasing costs, also presents a supplemental risk as regards sealing and the hygiene of the process.

A mounting of the temperature sensor directly on the membrane or on the oscillatory fork is, for mechanical reasons, not possible, since the oscillatory system is negatively affected thereby as regards its functional ability. An integration of temperature sensor into the housing of the fill-level measuring device is difficult because of the type of mounting of the piezoelectric driver/receiver unit. This is from the side of the housing facing away from the oscillatable unit using a pressure-exerting screw unit. If the temperature sensor is secured on the housing wall, it represents an impediment to the screwing of the screw unit.

Known from DE 102006007199 A1 is a vibration limit switch arrangement, in the case of which a temperature determining unit is placed, for example, in the region between the oscillatable unit and the transmitting/receiving unit. It is not shown how the coupling between transmitting/receiving unit and oscillatable unit occurs across the temperature sensor, so that one wonders how the transmission of the mechanical oscillations to the oscillatable unit can occur unimpaired.

SUMMARY OF THE INVENTION

An object of the invention is to provide a vibronic fill-level measuring device, with which additionally temperature of the measured medium can be determined, without degrading the oscillatory system.

The object is achieved by features including that the temperature sensor is integrated in a fill-level measuring device element, which is in thermal contact with the medium via the membrane or the housing, wherein the element is so selected that the oscillatable unit oscillates unimpaired by the temperature sensor.

Since the temperature sensor is integrated in an existing element of the fill-level measuring device, it is not a completely supplemental component. Therefore, the construction of a fill-level measuring device with the temperature sensor differs from the construction of a fill-level measuring device without the temperature sensor only in the features that a certain element is replaced by a similar element with the temperature sensor and additional connection lines for electrical contacting of the temperature sensor are present. This facilitates the manufacture and offers the additional advantage that no additional place for the temperature sensor is required in the fill-level measuring device. The element, in which the temperature sensor is integrated, is located preferably in the vicinity of the driver/receiver unit, wherein the vicinity comprises the region of the measuring device, which lies between the oscillatable unit and the pressure screw unit. The pressure screw unit is, in such case, included within such vicinity. In principle, any existing fill-level measuring device element, whose temperature adjusts to that of the medium, is suitable for accommodating the temperature sensor. Small deviations between temperature of the medium and temperature at the site of the temperature sensor can, in the case of known deviations, be taken into consideration in determining the temperature of the medium. By correcting the measured temperature values with a formula corresponding to the deviations, existing temperature differences are cancelled, so that temperature of the medium is determinable within the limits of the desired accuracy.

A first embodiment of the solution of the invention includes that the piezoelectric elements of the driver/receiver unit are connected with one another via a bolt, that the bolt has a contact piece with a contact surface with the membrane for transmitting the oscillations, that the bolt is provided in the region between the driver/receiver unit and the contact surface with the membrane with a bore extending laterally to the longitudinal axis, and that the temperature sensor is mounted in the bore.

The integration of the temperature sensor into the bolt is especially advantageous, since this in direct contact with the measured medium and thereby, temperature at the site of the temperature sensor adjusts rapidly to that of the measured medium.

In a further development of the invention, the bore is located in the collar-like element of the bolt between the driver/receiver unit and the contact surface with the membrane laterally and orthogonally to the longitudinal axis.

In an alternative embodiment, the bore is located in the bolt in the rod-shaped element or in the rod-shaped element and the collar-like element between the driver/receiver unit and the membrane and extends in the direction of the longitudinal axis.

The advantage this embodiment is that the lines for contacting the temperature sensor can be led through the rod-shaped element and through a bore adjoining the rod-shaped element in the pressure screw unit to the housing side, in which the electronics unit is located. In this way, attention does not have to be paid to insulation relative to the lines of the piezoelectric elements.

In an additional embodiment of the invention, the bolt comprises metal or ceramic. Preferably, the metal is stainless steel.

In a further development of the fill-level measuring device of the invention, the temperature sensor is sintered in the bolt.

In a further development of the invention, a ceramic element and a contact piece with a contact surface with the membrane for transmitting the oscillations to the membrane are provided in the region between the driver/receiver unit and the membrane and the temperature sensor is mounted in the ceramic element.

In this embodiment, no bolt is present extending through the piezoelectric elements of the driver/receiver unit. The integrity of the stacked piezoelectric elements is assured, for example, by the feature that they are adhered with one another or they are arranged in a shell, or exoskeleton. Additionally, the pressure screw unit provides along the longitudinal axis a force on the piezoelectric elements, whereby they are held together as a stack.

Instead of the collar-like element of the bolt in the case of a driver/receiver unit formed of annular piezoelectric elements in the case of washer shaped piezoelectric elements without bolt, a ceramic element is provided for electrical insulation between the piezoelectric elements and the membrane, or the contact piece. The ceramic element has preferably the same shape as the collar-like element of the bolt.

In a further development of the solution of the invention, the temperature sensor is sintered into the ceramic element.

An advantageous embodiment provides that the ceramic element is manufactured from a semiconductor material, that the ceramic element is provided on the surface facing the membrane as well as on the surface facing the first piezoelectric element with a metal coating and that the coated ceramic element forms the temperature sensor.

Another further development of the invention comprises that the piezoelectric elements of the driver/receiver unit have connection lines, that the temperature sensor likewise has connection lines, that the pressure screw unit has cavities, and that the cavities in the pressure screw unit serve for accommodating the connection lines of the piezoelectric elements and the connection lines of the temperature sensor.

For example, the connection lines are embodied as conductive traces on a flexible circuit board and connected via solder tabs with the piezoelectric elements as well as with the temperature sensor. For accommodating the lines on the other end of the pressure screw unit, where the electronics is located, cavities are provided in the pressure screw unit, through which the connection lines, now embodied as wire conductors, are led.

In an additional advantageous embodiment, the temperature sensor is mounted in the pressure screw unit. This embodiment offers the advantage that the region of the fill-level measuring device, which contains the driver/receiver unit, remains unchanged. If temperature sensor is mounted, for example, into the pressure screw unit from the side of the housing accommodating the electronics, then only a bore in the pressure screw unit is necessary, in order to insert the temperature sensor. A feedthrough for the connection lines is not required. Since the housing is preferably manufactured of metal, and the housing is in contact with the medium, whose temperature is to be determined, on the side having the oscillatable unit, thermal contact between the medium and the temperature sensor is produced via the housing.

A further development of the fill-level measuring device of the invention provides that the fill-level measuring device is a measuring device for determining a predetermined fill level and the density of a medium with an oscillatory fork mounted on the membrane.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
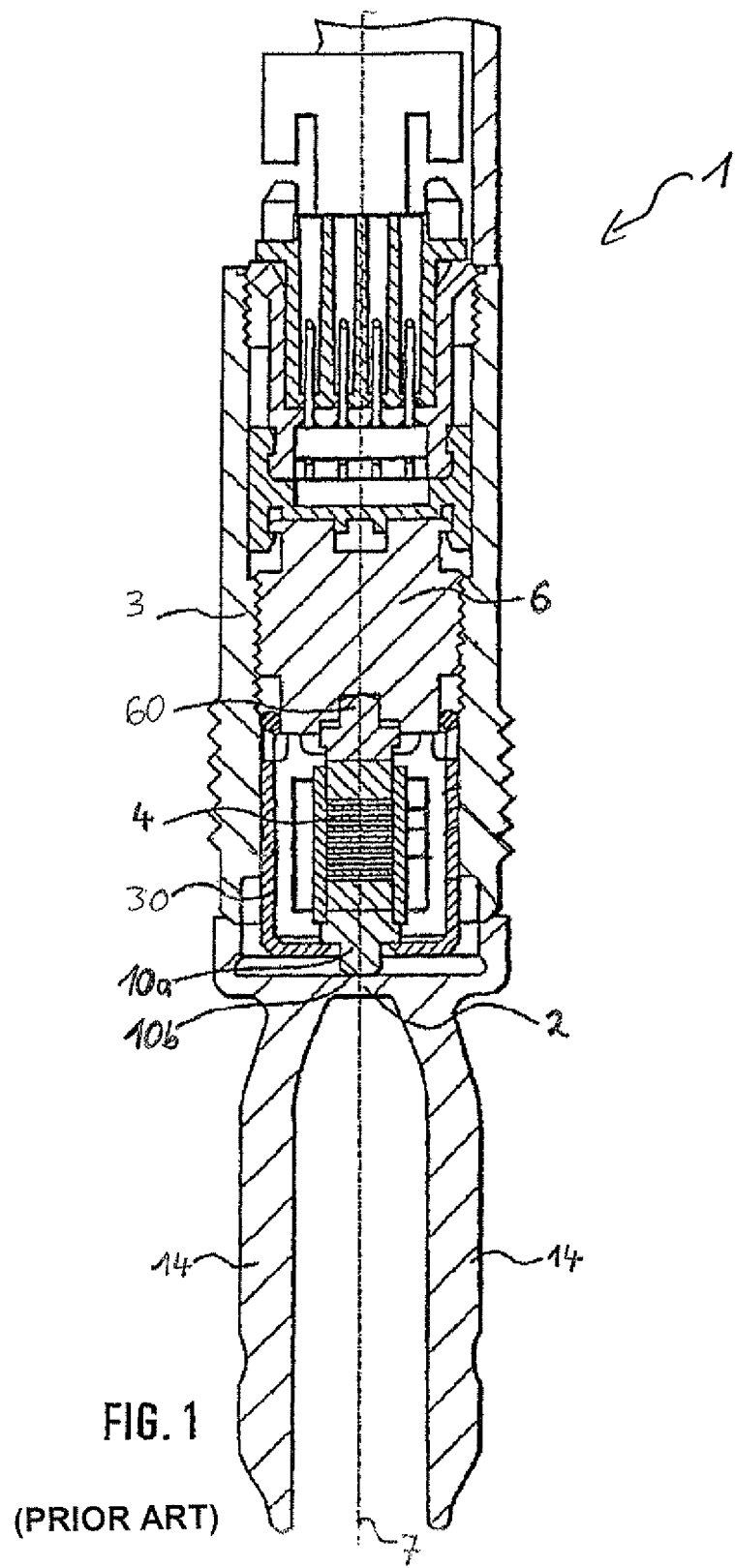
FIG. 1 is a fill-level measuring device of the state of the art.

FIG. 1 shows a section through a vibronic fill-level measuring device 1 of the state of the art; there is, consequently, no temperature sensor on the fill-level measuring device 1. Construction of a vibronic fill-level measuring device 1 of the state of the art will be explained based on the figure.

The housing 3 includes a housing insert 30, which is mounted in one of the two end regions of the tubular housing 3. Such end region is sealed by the membrane 2, on which is secured the oscillatable unit, which is embodied in this example as oscillatory fork 14. Located in the housing insert 30 is the driver/receiver unit 4, which in this example of an embodiment is embodied as a stack drive, which is composed of piezoelectric elements 5 adhered with one another arranged in a stack.

The driver/receiver unit 4 is clamped in such a manner between the pressure screw unit 6 and the membrane 2 that the pressure screw unit 6 causes a prestress in the membrane 2 and the membrane 2 is excited by the driver/receiver unit 4 to execute oscillations in the direction of the longitudinal axis 7 of the housing 3, which are transmitted to the oscillatory fork 14. Arranged between the pressure screw unit 6 and the driver/receiver unit 4 is a pedestal 60 for pressure transfer.

The driver/receiver unit 4 is connected with the membrane 2 via a contact piece 10a. Contact piece 10a is manufactured of an insulating material, for example, ceramic, and has preferably a hemisphere-like shape, so that the contact surface 10b with the membrane 2 is large enough, in order to transfer the oscillations of the driver/receiver unit 4 to the membrane 2 in such a manner that the membrane is not damaged.

The oscillations executed by the oscillatable unit 14 are received b the driver/receiver unit 4 and forwarded to a control/evaluation unit (not shown), which is located, for example, in a housing head on the end region of the housing 3 opposite the membrane 2. The control/evaluation unit evaluates the oscillations as regards frequency, amplitude and/or phase and ascertains therefrom the reaching of a predetermined fill level or the density of the measured medium.

Figure 2A:
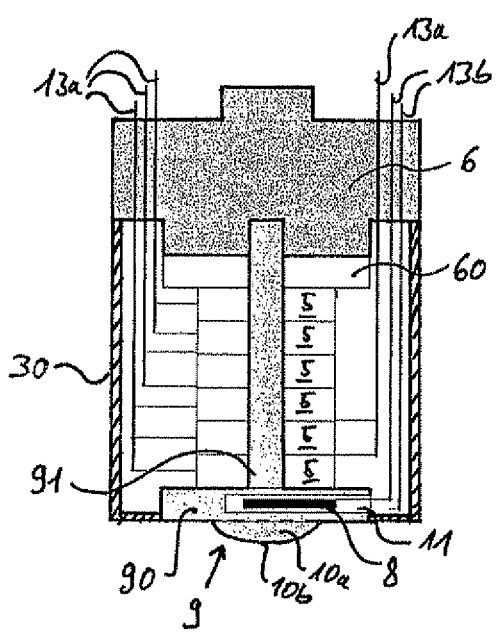
FIG. 2a is a detail view of a first embodiment of the driver/receiver unit and a first arrangement of the temperature sensor.
Figure 2B:
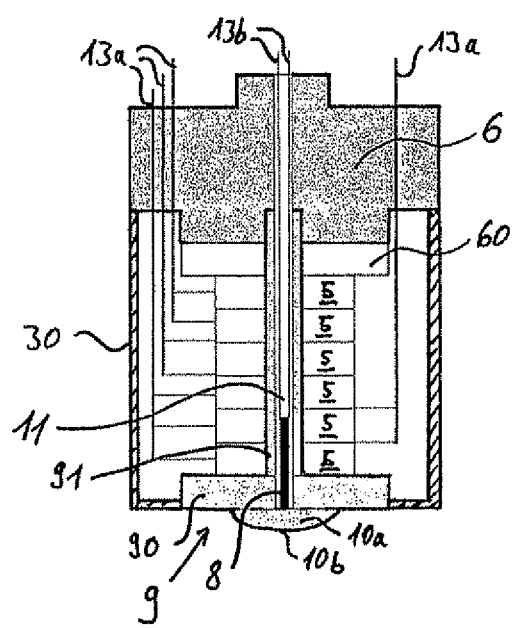
FIG. 2b is a detail view of a first embodiment of the driver/receiver unit and a second arrangement of the temperature sensor.

FIGS. 2a and 2b disclose a first option for an embodiment of the fill-level measuring device of the invention 1 with annular piezoelectric elements 5 and a temperature sensor 8. The driver/receiver unit 4 is, in such case, constructed of a plurality of annular piezoelectric elements 5 stacked on a bolt 9, whose end forms the pedestal 60, which transmits the pressure of the pressure screw unit 6 to the driver/receiver unit 4. The pressure screw unit 6 seals the housing insert 30, in which the driver/receiver unit 4 is mounted and the bolt 9 is screwed in.

Bolt 9 is composed of metal or a ceramic suitable for transmission of oscillations. Bolt 9 includes besides the rod-shaped element 91, which serves for holding the piezoelectric elements 5 together in their mounted state, a collar-like element 90 and a contact piece 10a. Preferably, rod shaped element 91, collar-like element 90 and contact piece 10a are cast as one piece. In an alternative embodiment, the elements forming bolt 9 are individually manufactured and subsequently joined. If the bolt 9 is manufactured of ceramic, then it is produced, for example, using CIM (ceramic injection molding) technology. If bolt 9 is a metal bolt, then such is surrounded by a ceramic sleeve, in order not to short circuit the piezoelectric elements 5. The preferably hemispherically formed contact piece 10a serves for transmitting the oscillations of the driver/receiver unit 4 to the membrane 2. The rounded shape of the contact piece 10a and the setting of a prestress in the membrane 2 via the pressure screw unit 6 assure that there is always contact between the membrane 2 and the contact piece 10a, so that transmitting of the oscillations from the driver/receiver unit 4 to the membrane 2 occurs safely at any time.

FIG. 2a shows a lateral introduction of the temperature sensor into the bolt 9. The collar-like element 90 forms the bearing surface of the stack of piezoelectric elements 5. In the collar-like element 90 of the bolt 9 is a lateral bore 11, in which the temperature sensor 8 is arranged. If the bolt 9 is manufactured of metal, then the temperature sensor 8 is mounted, for example, in a ceramic housing, for electrical insulation. In a preferred embodiment, the temperature sensor is sintered in the bore 11, i.e. bore 11 is sealed by a ceramic plug, which was subjected to a sinter process after the mounting in the bolt 9.

The piezoelectric elements 5 have connection lines 13a, which serve for their voltage supply. The connection lines 13a are led through cavities in the pressure screw unit 6 from the piezoelectric elements 5 to the control/evaluation unit. The temperature sensor 8 is preferably a metal resistance sensor, which is formed essentially of a meander shaped metal layer applied on a substrate. The resistance of the metal layer is temperature dependent. Preferably involved here is a platinum meander. Temperature sensor 8 likewise has connection lines 13b. These are led, in equal manner as in the case of the connection lines 13a of the piezoelectric elements 5, through the pressure screw unit 6. Either such occurs through the same cavities, through which also the connection lines 13a of the piezoelectric elements 5 are led, or separate cavities for the connection lines 13b of the temperature sensor 8 are provided in the pressure screw unit 6.

FIG. 2b shows a second example of an embodiment for the arrangement of the temperature sensor 8 in the bolt 9. In such case, the bore is not laterally extending in the collar-like element 90 of the bolt 9. Instead, the rod-shaped element 91 is provided with a bore extending centrally along its longitudinal axis and continuing into the collar-like element 90. In such way, the temperature sensor 8 inserted in the bore is in direct contact with the contact piece 10a, so that an optimal heat transfer to the oscillatable unit 14 is assured. An advantage in the case of such embodiment is that the connection lines 13b of the temperature sensor 8 can be led, isolated from the connection lines 13a of the piezoelectric elements 5, through a bore in the pressure screw unit 6 communicating with the bore in the bolt 9.

The assembly of a vibronic fill-level measuring device 1 with the temperature sensor 8 requires, compared with assembly without the temperature sensor 8, only the replacement of a bolt 9 without the temperature sensor with a bolt 9 with integrated temperature sensor 8 and the modifying of the cavities of the pressure screw unit 6.

The introduction of the temperature sensor 8 into the bolt 9 offers the advantage that the temperature sensor 8 is integrated in an existing component and, thus, except for the temperature sensor 8, no additional components are necessary. This, on the one hand, saves costs and, on the other hand, no additional steps or steps differing from conventional manufacturing steps are necessary for assembling the components.

Figure 3A:
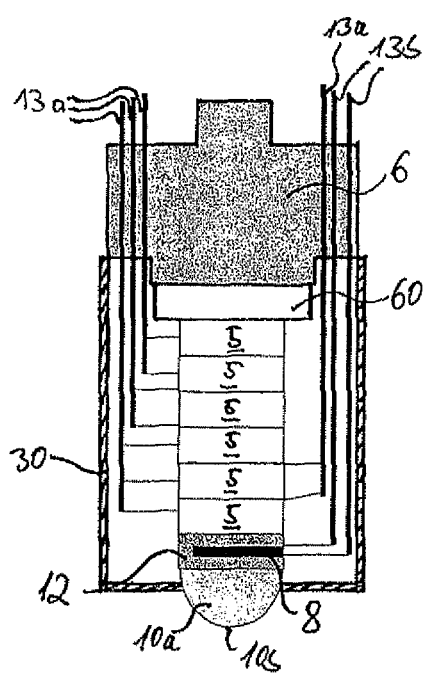
FIG. 3a is a detail view of a second embodiment of the driver/receiver unit and a third arrangement of the temperature sensor.
Figure 3B:
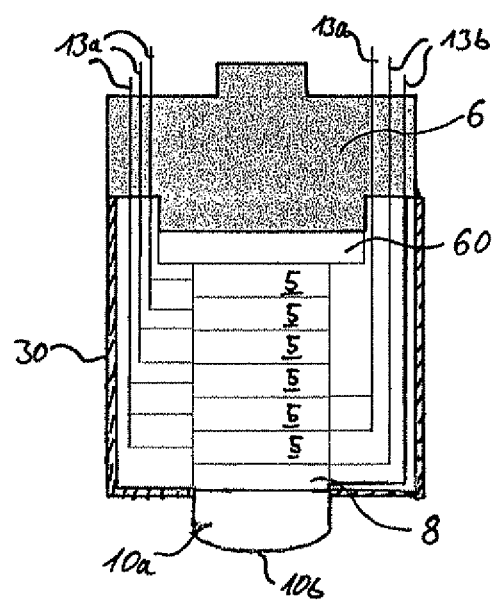
FIG. 3b is a detail view of a second embodiment of the driver/receiver unit and a special embodiment of the temperature sensor.

FIGS. 3a and 3b show a second embodiment of the vibronic fill-level measuring device 1 with a driver/receiver unit 4 embodied as a stack drive without bolt and a temperature sensor 8. While the piezoelectric elements 5 described in FIG. 2 are stacked on a bolt 9, the piezoelectric elements 5 of the driver/receiver unit 4 are, in these examples of embodiments for mounting, for example, held together by adhesive bonds or a shell, or exoskeleton. After assembly of the fill-level measuring device 1 is complete, the pressure screw unit 6 assures that the components are held together.

The installation of the driver/receiver unit 4 occurs via a housing insert 30, which is mounted in that end region of the tubular housing 3 sealed by the membrane 2. In the floor of the cup shaped housing insert 30 is the metal contact piece 10a for transmitting the oscillations of the driver/receiver unit to the membrane 2. For example, it is screwed into the floor. Between the contact piece 10a and the piezoelectric elements 5 is a ceramic element 12 for electrical insulation, which is adhered with the contact piece 10a and the lowest piezoelectric element 5.

The pressure screw unit 6 exercises via the pedestal 60 pressure on the driver/receiver unit 4 and assures, so, a fixed installed position of the membrane 2 with prestress in the housing 3. Additionally, the pressure screw unit 6 seals the housing insert 30 on its open side relative to the housing 3.

The temperature sensor 8 is, in the example of an embodiment illustrated in FIG. 3a, integrated into the ceramic element 12, wherein it is preferably mounted in a lateral bore. For example, the temperature sensor 8 is sintered in the ceramic element 12, i.e. the bore is sealed by a ceramic plug, which was subjected to a sinter process after the mounting on the ceramic element 12. In an alternative embodiment, the integration of the temperature sensor 8 occurs in the manufacture of the ceramic element 12 in the form of applying an intermediate layer, for example, of platinum. The ceramic element 12 is isolated only by the contact piece 10a from the membrane 2. Since it is a metal contact piece 10a, thermal coupling of the ceramic element 12 with the medium is assured via the membrane 2.

The ceramic element 12 is an established component of a vibronic fill-level measuring device 1 with adhered stack drive, so that the temperature sensor 8 is integrated in a space saving manner in an existing component. No housing for the temperature sensor 8 is necessary, since the ceramic element, in which it is integrated, is already electrically insulating.

In an alternative embodiment shown in FIG. 3b, the temperature sensor 8 is formed by the ceramic element 12 itself, in that a semiconductor material is placed in the ceramic material and the ceramic element 12 is coated with a metal on the lateral surface facing the membrane 2 as well as on the lateral surface facing the piezoelectric elements 5 of the driver/receiver unit. Instead of connection lines 13b, an option is that the metal layers are provided with solder tabs, via which they are connected with conductive traces on a circuit board, wherein likewise conductive traces are provided on the circuit board for the piezoelectric elements 5.

Figure 4:
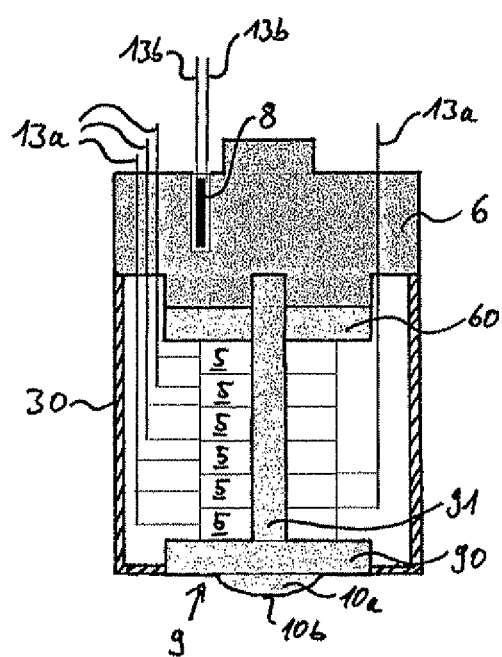
FIG. 4 is a detail view of an alternative arrangement of the temperature sensor.

FIG. 4 shows a further example of an arrangement of the temperature sensor 8, which is an option both in connection with the, for example, adhered stack drive without bolt 9 as well as also in connection with the annular piezoelectric elements 5 stacked on the bolt 9. The temperature sensor 8 is integrated, in such case, into the pressure screw unit 6. The thermal contact with the medium, whose temperature is to be determined, is produced via the metal housing 3, so that the temperature sensor 8, in spite of the, in comparison with the other examples of embodiments, greater distance to the medium, determines its temperature relatively exactly. Relative exactly means, in such case that the deviations between actual temperature of the medium and determined temperature of the medium lie within usual specifications.

The invention claimed is:

1. A fill-level measuring device for determining fill level of a medium in a container or a pipeline, comprising:
   a tubular housing;
   a membrane, which is placed in such a manner on one of the two end regions of said tubular housing that it seals said tubular housing on such end region;
   an oscillatable unit placed on the side of said membrane facing away from said tubular housing;
   a driver/receiver unit, including a plurality of piezoelectric elements arranged in a stack;
   a pressure screw unit, said driver/receiver unit being placed via said pressure screw unit in such a manner in said tubular housing that it oscillates in the direction of the longitudinal axis of said tubular housing between said membrane and said pressure screw unit, whereby it excites said oscillatable unit via said membrane to execute oscillations;
   a control/evaluation unit, which evaluates amplitude, frequency, and/or phase of the oscillations of said oscillatable unit; and
   a temperature sensor for determining temperature of the medium, wherein:
   said temperature sensor is integrated in a ceramic element, bolt or in the pressure screw unit, which are in thermal contact with the medium via said membrane or said tubular housing; and
   said ceramic element bolt or pressure screw unit are so selected that said oscillatable unit oscillates unimpaired by said temperature sensor.

2. The fill-level measuring device as claimed in claim 1, wherein:
   said piezoelectric elements of said driver/receiver unit are connected with one another via said bolt, said bolt has a contact piece with a contact surface with said membrane for transmitting the oscillations, said bolt is provided with a bore and said temperature sensor is mounted in said bore.

3. The fill-level measuring device as claimed in claim 2, wherein:
   said bore in said bolt is located in a collar-like element between said driver/receiver unit and said contact surface with said membrane laterally and perpendicularly to the longitudinal axis.

4. The fill-level measuring device as claimed in claim 3, wherein:
   said bore in said bolt is located in a rod-shaped element or in said rod-shaped element and said collar-like element between said driver/receiver unit and said membrane and extends in the direction of the longitudinal axis.

5. The fill-level measuring device as claimed in claim 2, wherein:
   said bolt is manufactured of metal or ceramic.

6. The fill-level measuring device as claimed in claim 2, wherein:
   said temperature sensor is sintered in said bolt.

7. The fill-level measuring device as claimed in claim 1, wherein:
   a contact piece with a contact surface with said membrane for transmitting the oscillations to said membrane are provided in the region between said driver/receiver unit and said membrane.

8. The fill-level measuring device as claimed in claim 7, wherein:
   said temperature sensor is sintered in said ceramic element.

9. The fill-level measuring device as claimed in claim 7, wherein:
   said ceramic element is manufactured from a semiconductor material, said ceramic element is provided on the surface facing said membrane as well as on the surface facing the first piezoelectric element with a metal coating and said coated ceramic element forms said temperature sensor.

10. The fill-level measuring device as claimed in claim 1, wherein:
    said piezoelectric elements of said driver/receiver unit have connection lines, said temperature sensor likewise has connection lines, said pressure screw unit has cavities; and
    said cavities in said pressure screw unit serve for accommodating said connection lines of said piezoelectric elements and said connection lines of said temperature sensor.

11. Fill-level measuring device as claimed in claim 1, wherein:
    the fill-level measuring device is a measuring device for determining a predetermined fill level and the density of a medium with an oscillatory fork mounted on said membrane.

* * * * *